United States Patent Office 3,577,451
Patented May 4, 1971

---

3,577,451
SULFAMIDE DERIVATIVES
Engelbert Kühle, Bergisch-Gladbach, Erich Klauke, Cologne-Flittard, Paul-Ernst Frohberger, Burscheid, Bezirk, Dusseldorf, and Hans Scheinpflug, Leverkusen, Germany, assignors to Farbenfabriken Bayer Aktiengesellschaft, Leverkusen, Germany
No Drawing. Filed Jan. 20, 1967, Ser. No. 610,500
Claims priority, application Germany, Feb. 17, 1966,
F 48,451
Int. Cl. C07c *143/00*
U.S. Cl. 260—453          7 Claims

ABSTRACT OF THE DISCLOSURE

The disclosure covers broadly N,N'-di(alkyl and/or alkenyl) - [N - mono(fluorodichloromethylmercapto) or N,N' - di(fluorodichloromethylmercapto)] - sulfamides which possess fungicidal properties and which may be prepared by conventional procedures.

---

The present invention relates to and has for its objects the provision for particular new sulfamide derivatives, and especially N,N'-di(alkyl and/or alkenyl)-[N-mono (fluorodichloromethylmercapto) or N,N'-di(fluorodichloromethylmercapto)]-sulfamides, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is already known that compounds which contain a trichloromethylmercapto group or a fluorodichloromethylmercapto group can be used as active fungicidal compounds. Some of these active compounds have achieved very great importance in practice (cf. German Patent 921,290 and German published specification 1,193,498).

It has now been found in accordance with the present invention that the particular new sulfamide derivatives, and especially N,N'-di-hydrocarbon substituted-fluorodichloromethylmercapto-sulfamides, of the general formula:

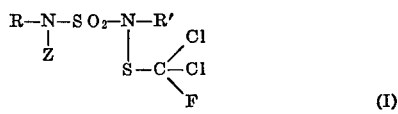

(I)

in which R and R' each respectively is selected from the group consisting of lower alkyl and lower alkenyl, and Z is selected from the group consisting of hydrogen and fluorodichloromethylmercapto, in fact possess markedly strong fungicidal properties.

It has been furthermore found in accordance with the present invention that a process for the production of the particular new sulfamide derivatives of general Formula I may be provided which comprises reacting disubstituted sulfamides of the formula $$R-NH-SO_2-NH-R'$$  (II)

in which R and R' are the same as defined above, with fluorodichloro-methane-sulfenyl chloride in a molar ratio of about 1:1 or about 1:2 and in the presence of an acid-binding agent.

It is definitely surprising that the active compounds of the present invention have a better fungicidal action than the fungicides of similar chemical structure hitherto known. The particular new active compounds of the present invention therefore constitute a significant advance in the art.

The course of the reaction in the production process according to the present invention can be illustrated by the following formula scheme, dimethyl sulfamide being used as starting material:

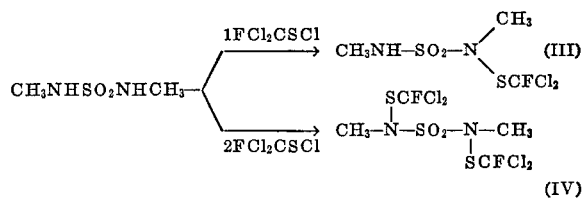

The starting compounds for the instant reaction are generally known in principle. The starting sulfamides are clearly characterized by Formula II above and those which may not yet be known may be prepared in the same manner as the known sulfamides, i.e., by reacting the corresponding primary amines with sulfuryl chloride.

The instant reaction can be carried out in the presence of inert organic solvents including, for example, hydrocarbons, such as benzene, or ethers, such as diethyl ether and dioxan. However, it is also possible to carry out the reaction in the presence of water.

The usual acid binders can be used herein as acid-binding agents, for example tertiary amines, such as triethylamine and pyridine, and inorganic bases, such as alkali metal carbonates and alkali metal hydroxides, especially sodium and potassium carbonates and hydroxides.

The reaction temperatures may be varied within a fairly wide range. In general, the operation is carried out substantially between about 0 and 80° C., and preferably between about 20 and 50° C.

To carry out the instant production process, either about 1 mol or about 2 mols of fluorodichloromethane-sulfenyl chloride are used per mol of starting sulfamide, depending on the desired final product. It is expedient to work in the presence of a diluent, i.e., organic solvent or water as aforesaid. Working up of the reaction product may be carried out in the usual manner.

The particular new active compounds of the present invention exhibit a markedly high fungitoxic effect and a broad spectrum of activity and have a comparatively low toxicity towards warm-blooded animals; they are therefore easy to handle and can be used in practice for combating undesired fungus growth. Their good compatibility with higher plants also permits their application against fungous plant diseases by treating the grown cultivated plants or individual parts thereof or the corresponding seeds or even the cultivated soil. The instant active compounds are particularly effective against fungi causing tracheomycosis, which attack the plant from the soil, such as Verticillium species, Fusarium species and Phialophora species. However, they are also very effective against seed-borne fungi, such as *Tilletia tritici*, and against soil-borne fungi, such as Rhizoctonia species, Fusarium species, Pythium species and Thielaviopsis species.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents such as other fungicides and insecticides, acaricides, nematicides, fertilizers, and soil structure improving agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct soil treatment generally contemplate those in which the active compound is present in an amount substantially between about 0.1 and 20% by weight, and preferably 0.5 and 10% by weight, of the mixture. In formulations suitable for seed treatment, the active compound is present in an amount substantially between about 0.5 and 95% by weight, and preferably 5 and 90% by weight, of the mixture. Thus, the present invention contemplates over-all compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.1 and 95% by weight and preferably 0.1 and 90% by weight, of the mixture.

Furthermore, the present invention contemplates methods of selectively controlling and combating fungi, which comprise applying to at least one of (a) such fungi and (b) their habitat a fungicidally effective amount of the particular compound of the invention alone or together with a carrier vehicle as noted above. The instant formulations or compositions are applied in the usual manner, for example, by spraying, atomizing, vaporizing, scattering, dusting, watering, sprinkling, pouring, dry dressing, slurry dressing, moist dressing, wet dressing, and the like, for example to the plants, seeds or soil.

In particular, the concentration of the active compound of the invention which is utilized with the carrier vehicle will depend upon the intended application, as the artisan will appreciate. Thus, in special cases, it is possible to go above or to go below the above-mentioned range of concentration. For seed dressing purposes, substantially between about 10 mg. and 10 g., and preferably substantially between about 100 mg. and 3 g., of active compound are generally applied per kg. of seed. For soil treatment purposes, which can be carried out over the whole surface or in stripes or spots, concentrations of the active compound ranging substantially between about 1 and 1000 g., and preferably substantially between about 10 and 200 g., per cubic meter of soil are generally required at the place to be treated.

The following examples are given for the purpose of illustrating, while not limiting, the fungicidal utility of the particular new compounds according to the present invention:

EXAMPLE 1

Soil treating agent test/borne mycoses

To produce a suitable preparation of the particular active compound, such active compound is extended with talc to a content of 5% and subsequently with quartz sand to a content of 0.5% of active compound.

The resulting preparation of the active material is homogeneously mixed with Fruhstorfer standard soil, which has first been sterilized and then inoculated with pure cultures of the test fungus. The soil is filled into five pots, each of which is sown with 10 seeds of the host plants. The pots are placed in a greenhouse at stated temperatures and kept normally moist.

Three weeks after sowing, the number of healthy plants is determined as a percentage of seeds sown. 0% means that no healthy plants have grown, whereas 100% means that healthy plants have resulted from all the seeds.

The active compounds, their concentrations in the soil, the test fungi, host plants, greenhouse temperatures and the results obtained can be seen from the following Table 1:

soil which when sown with wrinkled peas, is known to lead to high losses of seedlings due to *Pythium ultimum*.

TABLE 1
Soil treating agent/soil-borne mycoses

| Active compound | Concentration of active compound as mg./ liter of soil | Test fungi |  |  |  |
|---|---|---|---|---|---|
|  |  | *Rhizoct. solani* | *Fusarium culmorum* | *Verticill. alboatrum* | *Thielaviopsis basicola* |
|  |  | Host plant |  |  |  |
|  |  | Peas | Peas | Peas | Cotton |
|  |  | Temperature range |  |  |  |
|  |  | 18–22° C. | 22–25° C. | 22–25° C. | 22–25° C |
|  |  | Number of healthy plants as percent |  |  |  |
| Standard soil, sterilized and untreated |  | 93 | 91 | 87 | 79 |
| Standard soil, sterilized and untreated, yet inoculated with test fungi |  | 2 | 12 | 11 | 0 |
| (A) N-Trichloromethyl-thiotetrahydro-phthalimide | 100 | 25 | 35 | 38 | 46 |
| (cf. German Patent 921,290) | 200 | 34 |  |  |  |
|  | 500 | 42 |  |  |  |
| (B) $CH_3-N-SO_2-N-CH_3$ | 100 | Phytotoxic |  |  |  |
| $\quad\quad\ \ |\quad\quad\quad\ |$ |  |  |  |  |  |
| $\quad\quad CH_3\quad\ SCFCl_2$ |  |  |  |  |  |
| (cf. German published specification 1,193,498) |  |  |  |  |  |
| (C) $CH_3-N-SO_2-N-\langle\bigcirc\rangle-CH_3$ | 100 | 0 | 0 | 22 | 18 |
| $\quad\quad\ \ |\quad\quad\quad\ |$ |  |  |  |  |  |
| $\quad\quad CH_3\quad\ SCFCl_2$ |  |  |  |  |  |
| (cf. German published specification 1,193,498) |  |  |  |  |  |
| (D) $CH_3-N-SO_2-N-\langle\bigcirc\rangle$ with $CH_3$ ortho | 100 | 5 | 0 | 0 | 24 |
| $\quad\quad\ \ |\quad\quad\quad\ |$ |  |  |  |  |  |
| $\quad\quad CH_3\quad\ SCFCl_2$ |  |  |  |  |  |
| (cf. German published specification 1,193,498) |  |  |  |  |  |
| (IV') $CH_3-N-SO_2-N-CH_3$ | 100 | 90 |  |  |  |
| $\quad\quad\quad\ |\quad\quad\quad\ |$ |  |  |  |  |  |
| $\quad\quad\ SCFCl_2\ SCFCl_2$ |  |  |  |  |  |
| (a) |  |  |  |  |  |
| (V) $C_2H_5-N-SO_2-N-C_2H_5$ | 100 | 85 |  |  |  |
| $\quad\quad\quad |\quad\quad\quad |$ | 200 | 84 |  |  |  |
| $\quad\quad SCFCl_2\ SCFCl_2$ |  |  |  |  |  |
| (b) |  |  |  |  |  |
| (VI) $C_3H_7-N-SO_2-N-C_3H_7$ | 100 | 72 | 61 |  |  |
| $\quad\quad\quad |\quad\quad\quad |$ | 200 | 82 |  |  |  |
| $\quad\quad SCFCl_2\ SCFCl_2$ |  |  |  |  |  |
| (c) |  |  |  |  |  |
| (VII) $C_4H_9-N-SO_2-N-CH_3$ | 100 | 75 | 54 |  |  |
| $\quad\quad\quad |\quad\quad\quad |$ | 200 | 88 |  |  |  |
| $\quad\quad SCFCl_2\ SCFCl_2$ |  |  |  |  |  |
| (VIII) $C_2H_5-N-SO_2-N-CH_3$ | 100 | 75 |  | 80 | 80 |
| $\quad\quad\quad |\quad\quad\quad |$ | 200 | 84 |  |  |  |
| $\quad\quad\ \ H\quad\ SCFCl_2$ |  |  |  |  |  |
| (IX) $C_3H_7-N-SO_2-N-C_3H_7$ | 100 | 71 | 71 |  |  |
| $\quad\quad\quad |\quad\quad\quad |$ |  |  |  |  |  |
| $\quad\quad\ \ H\quad\ SCFCl_2$ |  |  |  |  |  |
| (d) |  |  |  |  |  |
| (X) $C_4H_9-N-SO_2-N-CH_3$ | 100 | 70 | 59 | 83 | 70 |
| $\quad\quad\quad |\quad\quad\quad |$ | 200 | 84 |  |  |  |
| $\quad\quad\ \ H\quad\ SCFCl_2$ |  |  |  |  |  |
| (XI) $CH_2=CH-CH_2-N-SO_2-N-CH_2-CH=CH_2$ | 50 | 53 |  |  |  |
| $\quad\quad\quad\quad\quad |\quad\quad\quad |$ | 100 | 79 | 32 |  |  |
| $\quad\quad\quad\ \ SCFCl_2\ SCFCl_2$ | 200 | 84 | 46 |  |  |
| (XIV) iso-$C_3H_7-N-SO_2-N-C_3H_7$-iso | 100 | 61 | 75 |  |  |
| $\quad\quad\quad\quad\quad |\quad\quad\quad |$ |  |  |  |  |  |
| $\quad\quad\quad\ \ SCFCl_2\ SCFCl_2$ |  |  |  |  |  |

EXAMPLE 2

Soil treating agent test/*Pythium ultimum*

To produce a suitable preparation of the particular active compound, such active compound is extended with talc to a content of 5% and subsequently with quartz sand to a content of 0.5% of active compound.

The resulting preparation of the active compound is homogeneously mixed with naturally infested compost soil which when sown with wrinkled peas, is known to lead to high losses of seedlings due to *Pythium ultimum*.

The soil is filled into five pots, each of which is sown with 10 seeds of wrinkled peas. The pots are placed in a greenhouse at 15–18° C. and kept normally moist.

Three weeks after sowing, the number of healthy plants is determined as a percentage of the seeds sown. 0% means that no healthy plants have grown, whereas 100% means that healthy plants have resulted from all the seeds.

The active compounds, their concentrations in the soil and the results obtained can be seen from the following Table 2:

with the dressing in a closed glass flask. The seed is thereafter placed on moist loam under a cover of a layer of TABLE 2
Soil treating agent test/*Pythium ultimum*

| Active compound | Concentration of active compound as mg./liter of soil | Number of healthy plants as percent |
| --- | --- | --- |
| Untreated | | 8 |
| (A') N-trichloromethyl-thiophthalimide (cf. German Patent 921,290) | 100 | 12 |
| (B') CH$_3$—N—SO$_2$—N—CH$_3$<br>　　　　｜　　　　｜<br>　　　CH$_3$　　　SCFCl$_2$<br>(cf. German published specification 1,193,498) | 100 | Phytotoxic |
| (C') CH$_3$—N—SO$_2$—N—⟨◯⟩—CH$_3$<br>　　　　｜　　　　｜<br>　　　CH$_3$　　　SCFCl$_2$<br>(cf. German published specification 1,193,498) | 100 | 14 |
| (D') CH$_3$—N—SO$_2$—N—⟨◯⟩(CH$_3$)<br>　　　　｜　　　　｜<br>　　　CH$_3$　　　SCFCl$_2$<br>(cf. German published specification 1,193,498) | 100 | 14 |
| (IV'') CH$_3$—N—SO$_2$—N—CH$_3$<br>　　　　｜　　　　｜<br>　　　SCFCl$_2$　SCFCl$_2$ | 25<br>50<br>100 | 72<br>80<br>88 |
| (V') C$_2$H$_5$—N—SO$_2$—N—C$_2$H$_5$<br>　　　　｜　　　　｜<br>　　　SCFCl$_2$　SCFCl$_2$ | 25<br>50<br>100 | 60<br>76<br>93 |
| (VII') C$_4$H$_9$—N—SO$_2$—N—CH$_3$<br>　　　　｜　　　　｜<br>　　　SCFCl$_2$　SCFCl$_2$ | 100 | 77 |
| (VIII') C$_2$H$_5$—N—SO$_2$—N—CH$_3$<br>　　　　｜　　　　｜<br>　　　H　　　　SCFCl$_2$ | 100 | 78 |
| (X') C$_4$H$_9$—N—SO$_2$—N—CH$_3$<br>　　　　｜　　　　｜<br>　　　H　　　　SCFCl$_2$ | 100 | 75 |
| (XI') CH$_2$=CH—CH$_2$—N—SO$_2$—N—CH$_2$—CH=CH$_2$<br>　　　　　　　　｜　　　　｜<br>　　　　　　SCFCl$_2$　SCFCl$_2$ | 50<br>100<br>200 | 92<br>96<br>96 |

EXAMPLE 3

Seed dressing test/wheat smut (seed-borne mycosis)

To produce a suitable dry dressing, the particular active compound is extended with a mixture of equal parts by weight of talc and kieselguhr to give a finely powdered mixture with the desired concentration of the active compound.

Wheat seed is contaminated with 5 g. of the chlamydospores of *Tilletia tritici* per kg. of seed. To apply the dressing to the contaminated seed, such seed is then shaken with the dressing in a closed glass flask. The seed is thereafter placed on moist loam under a cover of a layer of muslin and 2 cm. of moderately moist compost soil and kept for 10 days in a refrigerator at 10° C. under optimum germination conditions for the spores.

The germination of the spores on the wheat grains, each of which is contaminated with about 100,000 spores, is subsequently determined microscopically. The smaller the number of spores which have germinated, the more effective is the active compound.

The active compounds, their concentration in the dressing, the amount of dressing used and the percentage spore germination can be seen from the following Table 3:

TABLE 3
Seed dressing agent test/wheat smut

| Active compound | Concentration of active compound in dressing as percent by weight | Amount of dressing applied as g./kg. seed | Spore germination as percent |
| --- | --- | --- | --- |
| Untreated | | | 75 |
| (B'') CH$_3$—N—SO$_2$—N—CH$_3$<br>　　　　｜　　　　｜<br>　　　CH$_3$　　　SCFCl$_2$<br>(cf. German published specification 1,193,498) | 30 | 1 | 0.5 |
| (C'') CH$_3$—N—SO$_2$—N—⟨◯⟩—CH$_3$<br>　　　　｜　　　　｜<br>　　　CH$_3$　　　SCFCl$_2$<br>(cf. German published specification 1,193,498) | 30 | 1 | 0.5 |

TABLE 3—Continued

| Active compound | Concentration of active compound in dressing as percent by weight | Amount of dressing applied as g./kg. seed | Spore germination as percent |
|---|---|---|---|
| (D″) CH₃—N—SO₂—N—C₆H₄—CH₃ (with CH₃ on N and SCFCl₂ on other N) | 30 | 1 | 0.5 |
| (cf. German published specification 1,193,498) | | | |
| (IV‴) CH₃—N—SO₂—N—CH₃ (SCFCl₂, SCFCl₂) | 10 / 30 | 1 / 1 | 0.000 / 0.000 |
| (V‴) C₂H₅—N—SO₂—N—C₂H₅ (SCFCl₂, SCFCl₂) | 30 | 1 | 0.005 |
| (VI′) C₃H₇—N—SO₂—N—C₃H₇ (SCFCl₂, SCFCl₂) | 30 | 1 | 0.05 |
| (VII″) C₄H₉—N—SO₂—N—CH₃ (SCFCl₂, SCFCl₂) | 30 | 1 | 0.01 |
| (X″) C₄H₉—N—SO₂—N—CH₃ (H, SCFCl₂) | 30 | 1 | 0.01 |
| (XI″) CH₂=CH—CH₂—N—SO₂—N—CH₂—CH=CH₂ (SCFCl₂, SCFCl₂) | 10 / 30 | 1 / 1 | 0.000 / 0.000 |

EXAMPLE 4

Wilting test/carnations

In the test described below the active compounds marked (a), (b), (c) and (d) in the table of Example 1, i.e., compounds IV, V, VI and IX, were examined for their fungicidal effect against *Phialophora cinerescens*.

In the tests, carnation cuttings with well grown roots were planted in soil to which was added a mixture of maize flour and sand grown over with *Phialophora cinerescens*. In the case of untreated plants, this soil inoculation led to the first symptoms of the disease after three weeks and to complete wilting and dying of the plants after 5 to 6 weeks.

On the other hand, part of the inoculated soil was treated with preparations of the stated active compounds before planting the carnation cuttings. These preparations of the active compounds were produced by dissolving a fixed amount of the particular active compound in a mixture of 9 parts by weight acetone and 1 part by weight nonylphenol polyglycol ether and diluting this concentrate with water. In each case 250 ml. of the active compound preparation was poured onto 1000 ml. of soil. The preparation contained sufficient active compound for a concentration of 100 mg. of active compound per liter of soil to be present in the soil. Plants which were grown in soil treated in this way showed only a very slight infestation or none at all.

Comparison of the length and weight of control carnation plants which had not been infested by inoculating the soil with *Phialophora cinerescens* nor treated with an active compound preparation, with those carnation plants grown in soil which had been inoculated and then treated with the particular active compound preparations by watering, revealed that in most cases the treated plants had the same or even a higher average length and the same or even a higher average weight than the control plants. The stock of inoculated and active compound treated plants was thus just as good as that of the untreated non-infested control plants.

The production process of the present invention is illustrated, without limitation, by the following examples:

EXAMPLE 5

(VII‴)     C₄H₉N—SO₂—N—CH₃ with SCFCl₂ on each N 8 g. N-butyl-N′-methylsulfamide (about 0.048 mol) are dissolved in 100 ml. benzene and then 17 g. (about 0.1 mol) fluorodichloromethane-sulfenyl chloride are added. The resulting solution is mixed at room temperature with 11 g. triethylamine. The temperature rises to about 35° C. The precipitated triethylamine hydrochloride is filtered off with suction, the benzene solution is concentrated in a vacuum and 13 g. of the above compound, i.e., N-butyl-N′-methyl - N,N′ - di(fluorodichloromethylmercapto)-sulfamide, are obtained as residue in the form of a viscous oil.

*Analysis.*—Calc'd (percent): S, 22.2; Cl, 32.9. Found (percent): S, 22.2; Cl, 30.1.

The following compounds are obtained in the same manner:

N,N′-di(n-propyl)-N,N′-di(fluorodichloromethylmercapto)-sulfamide (VI″)     C₃H₇N—SO₂—N—C₃H₇ oily (with SCFCl₂ on each N)

Calc'd (percent): C, 21.5; H, 3.1; N, 6.3. Found (percent): C, 22.3; H, 3.5; N, 6.7.

N,N′-di(n-butyl)-N,N′-di(fluorodichloromethylmercapto)-sulfamide (XII)     C₄H₉N—SO₂—N—C₄H₉ oily (with SCFCl₂ on each N)

Calc'd (percent): C, 25.3; H, 3.8; N, 5.9. Found (percent): C, 26.4; H, 4.0; N, 6.2.

N,N'-diethyl-N,N'-di(fluorodichloromethylmercapto)-sulfamide (V''') 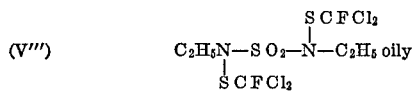 oily Calc'd (percent): N, 6.7; S, 22.9; Cl, 33.9. Found (percent): N, 7.3; S, 22.8; Cl, 31.6.

N,N'-dimethyl-N,N'-di(fluorodichloromethylmercapto)-sulfamide (IV'''') 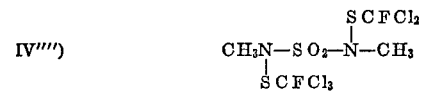

M.P. 80–83° C.

N,N'-di-isopropyl-N,N'-di(fluorodichloromethylmercapto)-sulfamide

XIV) 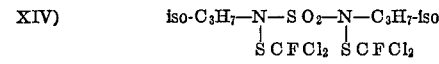

Calc'd (percent): S, 21.5; Cl, 31.8. Found (percent): S, 20.8; Cl, 30.5.

EXAMPLE 6

X''') 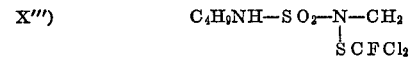

12 g. (about 0.072 mol) N-butyl-N'-methyl-sulfamide are dissolved in 100 ml. benzene and then 11 g. (about 0.065 mol) fluorodichloromethane-sulfenyl chloride is added. The resulting solution is mixed with 8 g. triethylamine. The temperature rises to about 30° C. The reaction mixture is shaken with water, the benzene layer is separated, and after drying and evaporating the solvent, there are obtained 13 g. of the above compound, i.e., N-butyl-N'-methyl-N'-fluorodichloromethylmercapto-sulfamide, in the form of an oily residue.

*Analysis.*—Calc'd (percent): S, 21.5; Cl, 23.8. Found (percent): S, 22.3; Cl, 24.6.

The following compounds are obtained in the same manner:

N-ethyl-N'-methyl-N'-fluorodichloromethylmercapto-sulfamide (VIII'') C$_2$H$_5$NH—SO$_2$—N—CH$_3$ oily
            |
            SCFCl$_2$ Calc'd (percent): S, 23.6; Cl, 26.2. Found (percent): S, 23.6; Cl, 27.3.

N,N'-di(n-propyl)-N'-fluorodichloromethylmercapto-sulfamide (IX') C$_3$H$_7$NH—SO$_2$—N—C$_3$H$_7$
                      |
                      SCFCl$_2$

M.P. 110° C.

N,N'-di(n-butyl)-N'-fluorodichloromethylmercapto-sulfamide (XIII) C$_4$H$_9$NH—SO$_2$—N—C$_4$H$_9$
                        |
                        SCFCl$_2$

M.P. 125° C.

EXAMPLE 7

(XI'') 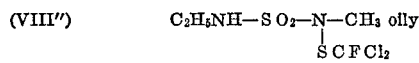

9 g. N,N'-diallyl-sulfamide are dissolved in 150 ml. benzene and then 11 g. triethylamine are added. The resulting solution is mixed dropwise at room temperature with 17 g. fluorodichloromethane-sulfenyl chloride. The temperature is allowed to rise up to 40° C. The reaction solution is shaken with water, the benzene solution dried over sodium sulfate, and after evaporating the benzene, there are obtained 20 g. of a viscous oil of the above formula, $N_D^{20}$ 1.5301, i.e., N,N'-di(α-allyl)-N,N'-di(fluorodichloromethylmercapto)-sulfamide.

EXAMPLE 8

In the same way, in accordance with the procedure of Example 7, using the stated molar amounts of the following starting materials per mol of fluorodichloromethanesulfenyl chloride:

(a) N-(but-3-en-1-yl)-N'-isopropyl-sulfamide (½ mol);
(b) N-(γ-allyl)-N'-(but-2-en-1-yl)-sulfamide (½ mol);

the respective final products are obtained:

(a') N - (but-3-en-1-yl)-N'-isopropyl-N'-fluorodichloromethylmercapto-sulfamide; and
(b') N-(γ - allyl)-N'-(but-2-en-1-yl)-N'-fluorodichloromethylmercapto-sulfamide.

Advantageously, in accordance with the present invention, in the foregoing formulae:

R and R' each respectively represents lower alkyl such as methyl, ethyl, n-propyl, isopropyl, n-butyl, isobutyl, sec.-butyl, tert.-butyl, and the like, and especially alkyl having 1–4 carbon atoms; or lower alkenyl such as γ-allyl, but-2-enyl, but-3-enyl, and the like, and especially alkenyl having 2–4 carbon atoms, particularly alkenyl having 3–4 carbon atoms; and Z represents hydrogen or fluorodichloromethylmercapto.

All of the foregoing compounds in accordance with the present invention possess the desired strong fungicidal properties, with regard to a broad spectrum of activity, enabling such compounds with a concomitant low toxicity toward warm-blooded creatures and corresponding favorable compatibility with plants to be used more effectively to control and/or eliminate fungi by application of such compounds to the fungi and/or their habitat.

It will be appreciated that the instant specification and examples are set forth by way of illustration and not limitation, and that various modifications and changes may be made without departing from the spirit and scope of the present invention.

What is claimed is:

1. The compound N,N'-dimethyl-N,N'-di(fluorodichloromethylmercapto)-sulfamide having the formula

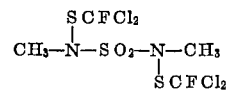

2. The compound N-(n-butyl)-N' - methyl - N,N' - di-(fluorodichloromethylmercapto) - sulfamide having the formula

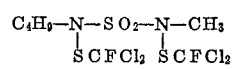

3. The compound N,N' - di(α - allyl)-N,N'-di(fluorodichloromethylmercapto)-sulfamide having the formula

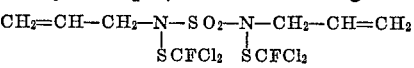

4. The compound N,N' - di(n - butyl)-N,N'-di(fluorodichloromethylmercapto)-sulfamide having the formula

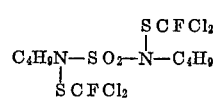

5. The compound N,N' - di(n - propyl)-N,N'-di(fluorodichloromethylmercapto)-sulfamide having the formula

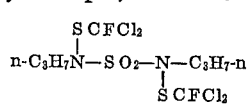

6. The compound N,N'-diethyl-N,N'-di(fluorodichloromethylmercapto)-sulfamide having the formula

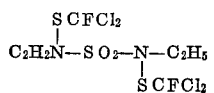

7. The compound N,N' - di(isopropyl)-N,N'-di(fluorodichloromethylmercapto)-sulfamide having the formula

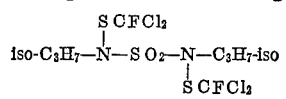

References Cited

UNITED STATES PATENTS

| 3,143,549 | 8/1964 | Lafferty et al. | 260—556 |
|---|---|---|---|
| 3,183,266 | 5/1965 | Matzner | 260—556 |
| 3,254,119 | 5/1966 | Appel et al. | 260—556 |
| 3,285,929 | 11/1966 | Klauke et al. | 424—321 |
| 2,844,628 | 7/1958 | Kühle et al. | 260—551 |

OTHER REFERENCES

| 1,365,808 | 5/1964 | France | 260—453 |
|---|---|---|---|
| 921,290 | 12/1954 | Germany | 260—551 |
| 1,137,435 | 10/1962 | Germany | 260—453 |
| 1,193,498 | 5/1965 | Germany | 260—551 |
| 1,239,297 | 4/1967 | Germany | 260—556 |

ELBERT L. ROBERTS, Primary Examiner

G. HOLLRAH, Assistant Examiner

U.S. Cl. X.R.

424—298, 321

PO-1050
(5/69)

UNITED STATES PATENT OFFICE
CERTIFICATE OF CORRECTION

Patent No. 3577451          Dated May 4, 1971

Inventor(s) Engelbert Kühle, Erich Klauke, Paul-Ernst Frohberger & Hans Scheinpflug It is certified that error appears in the above-identified patent and that said Letters Patent are hereby corrected as shown below:

Col. 4, line 57 (Spec. p. 8, line 19)

"test/borne mycoses" should be -- test/soil-born mycoses --

Col. 11, line 27 (Spec. p. 19, line 25)

"$CH_2$" should be -- $CH_3$ --

Col. 13, line 2 of first formula (Spec. claim 26)

"$C_2H_2N$" should be -- $C_2H_5N$ --

Signed and sealed this 24th day of August 1971.

(SEAL)
Attest:

EDWARD M. FLETCHER, JR.
Attesting Officer

WILLIAM E. SCHUYLER, JR.
Commissioner of Patents